United States Patent [19]
D'Ambra

[11] 3,811,705
[45] May 21, 1974

[54] EXTENDED FRONT END FOR A BIKE
[76] Inventor: Michael D'Ambra, 59 Seba Ave., Brooklyn, N.Y. 11229
[22] Filed: May 2, 1972
[21] Appl. No.: 249,663

[52] U.S. Cl............................... 280/279, 280/276
[51] Int. Cl............................................. B62k 3/00
[58] Field of Search ....... 280/279, 276, 280; D90/8, D90/9

[56] References Cited
UNITED STATES PATENTS

| | | | |
|---|---|---|---|
| 2,513,170 | 6/1950 | Harding | 280/276 |
| 3,295,863 | 1/1967 | Jaulmes | 280/279 X |
| 3,556,557 | 1/1971 | Blair | 280/279 |
| 3,513,926 | 5/1970 | Paget | 280/279 |
| D216,856 | 3/1970 | Black | D90/8 |

FOREIGN PATENTS OR APPLICATIONS

| | | | |
|---|---|---|---|
| 442,874 | 12/1948 | Italy | 280/276 |
| 968,389 | 2/1958 | Germany | 280/276 |
| 1,103,855 | 6/1955 | France | 280/276 |

Primary Examiner—David Schonberg
Assistant Examiner—Terrance L. Siemens
Attorney, Agent, or Firm—Carl Miller

[57] ABSTRACT

A special steering fork for replacing the standard steering fork of an ordinary bicycle, so to raise and extend the bicycle front end, thus giving it the appearance of an easy rider; the device consisting of a pair of parallel steel plates which are also secured to a fork neck tube that extends angularly respective to the long fork tubes and which pivotally supports the front end of the bicycle frame.

1 Claim, 4 Drawing Figures

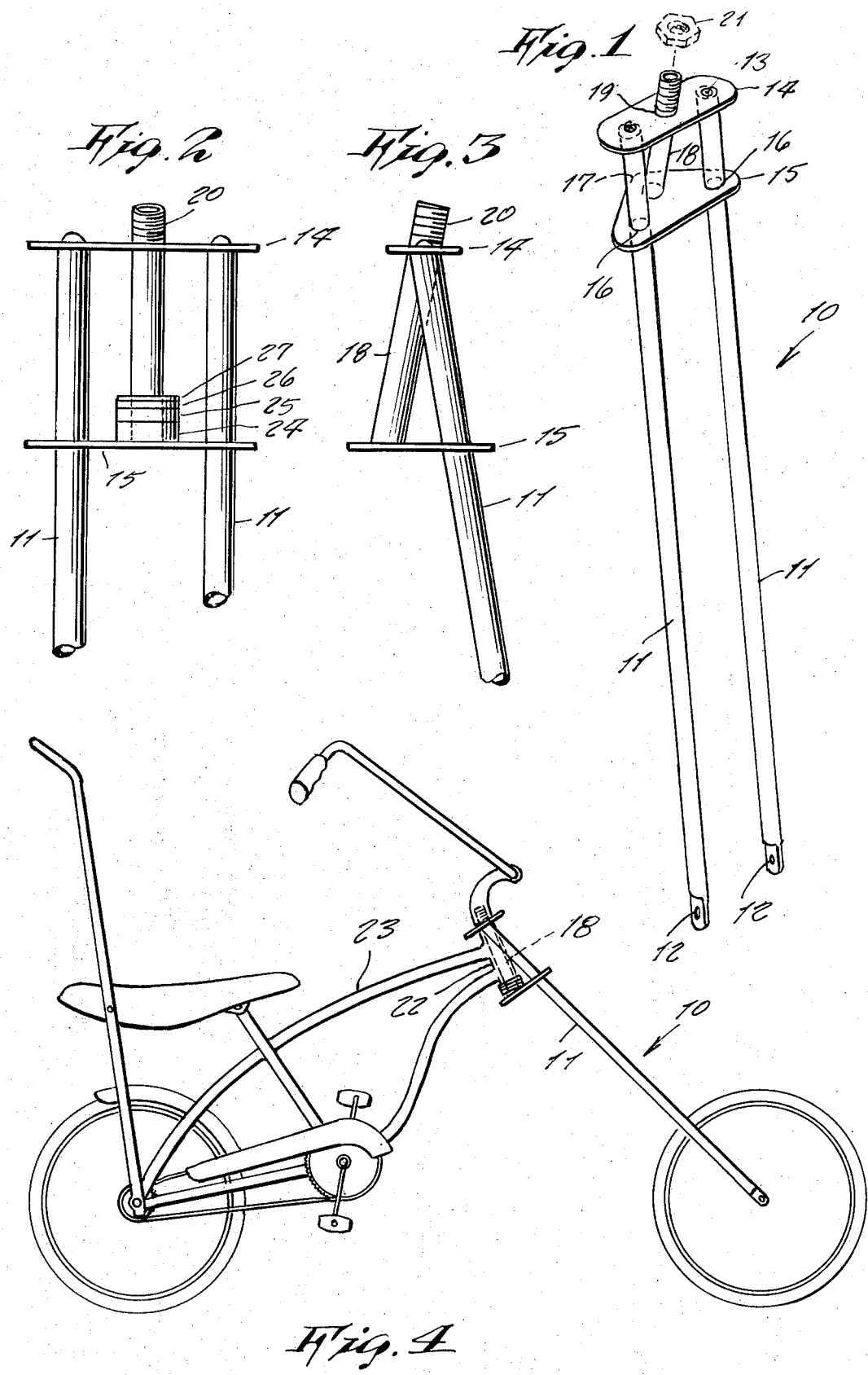

EXTENDED FRONT END FOR A BIKE

This invention relates generally to bicycles.

A principle object of the present invention is to provide a special steering fork which converts an ordinary bicycle into an easy rider, so that it has a modern appearance for greater appeal.

Another object is to provide a special steering fork which gives a new unique handling to the bicycle and which is a characteristic of an easy rider.

Yer another object is to provide a special steering fork which is readily adaptable to most conventional bicycles.

Yet a further object is to provide a special steering fork which can be installed on a bicycle within only a few minutes, and which requires no other tools than a pair of pliers.

Other objects are to provide a special steering fork which is simple in design, inexpensive to manufacture, rugged in construction, easy to use and efficient in operation.

FIG. 1 is a perspective view of the present invention.

FIG. 2 is a fragmentary front view thereof, shown enlarged.

FIG. 3 is a fragmentary side view thereof, shown enlarged.

FIG. 4 is a side view of the present invention installed on a bicycle.

Referring now to the drawing in detail, the reference numeral 10 represents a special steering fork according to the present invention wherein there are a pair of straight elongated front fork tubes 11 that are constructed of one inch outside diameter round steel tubing in lengths of 2 feet, 2½ feet, and 3 feet lengths, depending on the desired results. The lower ends of the tubes are flattened and a bearing opening 12 is provided therethrough for supporting a front wheel between the tubes.

The upper ends of the tubes are removably secured by means of Allen head screws 13 to a transverse upper steel plate 14 of 3/32 inch thickness. A lower steel plate 15 made of like thickness material is positioned in parallel, spaced apart relation to the upper plate 14 and openings 16 are provided for the tubes 11 to extend therethrough, the plate being then welded to the tubes. The tubes 11, are thus part of an assembly in which the tubes are parallel to each other.

The lower plate 15 is of a triangular shape so that an apex 17 thereof has one end of a neck tube 18 welded thereupon; the neck tube extending upwardly through an opening 19 in the center of the upper plate 14. The upper end of the neck tube extends above the upper plate and is provided with an external thread 20 so to engage a fork nut 21. An important feature of the invention is that the neck tube extends at an angle respective to the tubes 11 as shown in the side view of FIG. 3. Accordingly, when the neck tube is fitted in a steering post tube 22 of a standard bicycle frame 23, the lower part of tubes 11 then extend forwardly, as shown in FIG. 4.

In installing the present invention on a bicycle, the upper plate 14 is removed so the neck tube can be fitted into the frame tube 22. As best shown in FIG. 1, a series of spacers may be selectively used for filling up the left over space between the lower edge of frame tube 22 and the upper side of plate 15. These spacers include a 1 inch thick spacer 24, a 1/2 inch thick spacer 25, a 1/4 inch thick spacer 26, and a 1/8 inch thick spacer 27, all of which are made of appropriate material. The frame tubes 22 of different bicycle models are of varied so that either none, some or all of the spacers may be needed. After the neck tube is thus fitted in the frame tube, the upper plate 14 is refitted on the neck tube, and the screws 13 are then re-fitted through plate 14 and secured in threaded openings within the upper end of the tubes 11.

Thus an extended front end of a bicycle is provided.

A close inspection of the drawing readily indicates in FIGS. 3 and 4 that the angle between the neck tube 18 and fork tubes 11 is substantial, (being illustrated at approximately 22°), so that the front wheel is completely located forwardly of neck tube axis and substantially entirely ahead of the pivot between the bicycle frame and front fork, so that this pivoting action occurs somewhere above a midportion of the wheel base between the rear and front wheels. The increased wheel base gives a smoother ride over a bumpy road.

While certain novel features of my invention have been shown and described and are pointed out in the annexed claims, it will be understood that various omissions, substitutions and changes in the forms and details of the device illustrated and in its operation can be made by those skilled in the art without departing from the spirit of the invention.

Having thus set forth my invention, what I claim as new is:

1. In a special steering fork for replacement of a conventional steering fork of an ordinary bicycle, the combination of a pair of elongated, parallel, straight tubes which at their upper portions are fixedly retained in a transverse lower plate, a lower end of a neck tube being secured upon an upper side of said lower plate, said neck tube being angularly disposed relative to said long tubes at approximately 22°, a lower end of said long tubes including means for supporting a front wheel therebetween, a removable upper plate being attachable over an upper end of said long tubes, said upper and lower plates being parallel to each other, said upper plate having an opening therethrough and through which said neck tube extends upwardly, and an upper portion of said neck tube extending above said upper plate having an external thread for engaging a steering fork nut, a plurality of spacers of various thicknesses being receivable around said neck tube, and the angle between said long tubes and neck tube being substantial whereby said front wheel completely is located forwardly of an axis of said neck tube, so that a pivoting axis between said steering fork and a bicycle frame intersects that portion of the wheel base that is located between the outer diameters of said front wheel and a rear wheel of said bicycle.

* * * * *